P-N JUNCTION AND METHOD

Filed Feb. 15, 1960

ADOLF GOETZBERGER
*INVENTOR.*

*BY* Flehr and Swain
ATTORNEYS

United States Patent Office 3,109,760
Patented Nov. 5, 1963

3,109,760

P-N JUNCTION AND METHOD

Adolf Goetzberger, Palo Alto, Calif., assignor, by mesne assignments, to Clevite Corporation, Cleveland, Ohio, a corporation of Ohio Filed Feb. 15, 1960, Ser. No. 8,621
15 Claims. (Cl. 148—186)

Figure 1:
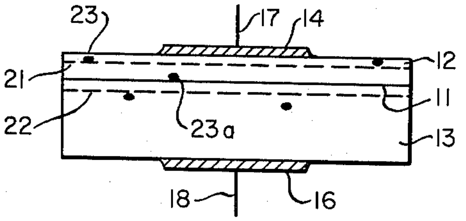

This invention relates generally to a p-n junction having localized excess reverse currents and to a method of forming the same.

The current voltage characteristics of a reverse biased p-n junction show, in general, avalanche multiplication, indicated by an abrupt increase in current at the avalanche breakdown voltage. This is generally seen on a current voltage plot as a "sharp" or "hard" corner. Below this voltage, the leakage current is very small.

In some cases, however, an excess current is observed below avalanche breakdown. The voltage current plot has a rounded or "soft" appearance. It is known that certain surface conditions may cause softness and that dislocations may produce a volume effect apparently associated with avalanche breakdown, also exhibiting softness.

However, the surface effects or the volume effects are relatively hard to control, and thus "soft" junctions having controlled characteristics cannot be made.

In certain applications, for example, in computers, it is often desirable to have "soft" devices. For example, it is often desirable to have characteristics in which the current varies as a power of the voltage. P-N junctions having localized excess reverse currents exhibit a current voltage relationship of this type.

It is, therefore, an object of the present invention to provide a p-n junction having localized excess reverse currents and method of forming the same.

It is another object of the present invention to provide a p-n junction in which the current varies as a power of the voltage.

It is still another object of the present invention to provide a p-n junction in which metal precipitates are disposed in the space charge region of the junction and method of forming the same.

In accordance with the present invention, a slice of semiconductive material is formed which includes a p-n junction. A metal is then precipitated in the space charge region of the junction. The precipitation is achieved by diffusing metal atoms into the semiconductive wafer. During operation, the precipitates give rise to high localized fields. It is believed that Zener tunnelling enters into the action of the device to give localized excess reverse currents.

The foregoing and other objects of the invention will be more clearly understood from the following description taken in conjunction with the accompanying drawing.

Figure 2:
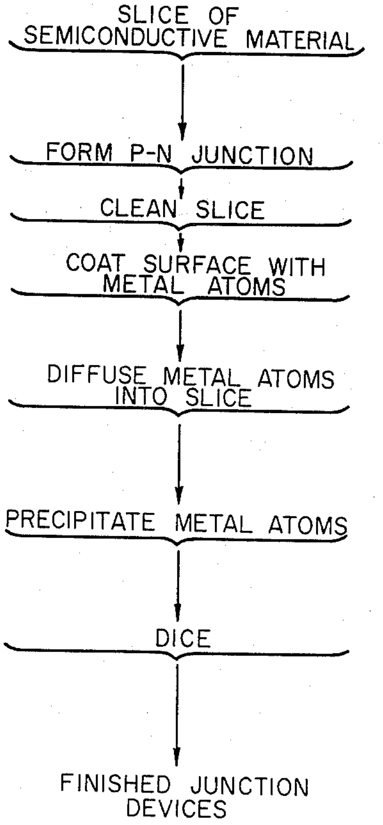
Figure 3:
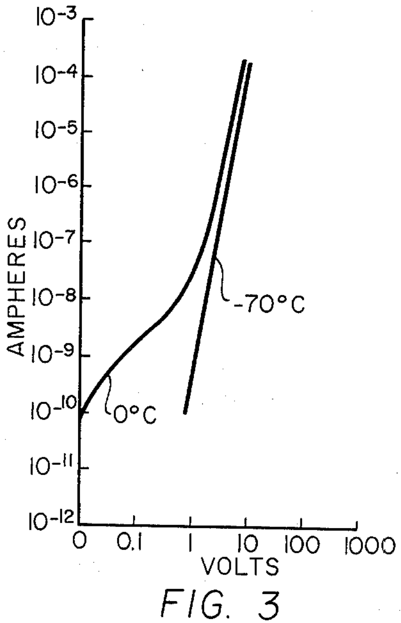
Figure 4:
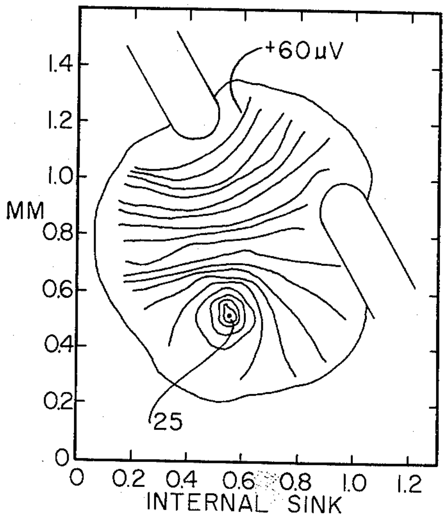

Referring to the drawing:

FIGURE 1 schematically illustrates a device formed in accordance with the invention;

FIGURE 2 sets out the steps in forming a device in accordance with the invention;

FIGURE 3 shows a typical voltage current characteristic for a device in accordance with the invention; and FIGURE 4 shows an equi-potential plot for a p-n junction in accordance with the invention and shows the localized current path.

Referring to FIGURE 1, there is shown a two-terminal, two-layer device including a junction 11. For example, the upper layer 12 may be a p-type layer, while the lower layer 13 is an n-type layer. Ohmic contact is made to the surface of the two layers as indicated at 14 and 16. Leads 17 and 18 provide means for connecting the device to external circuits.

Referring to the figure, the dotted lines 21 and 22 on each side of the junction schematically indicate the extent of the space charge layer with reverse voltages applied to the junction. The dots 23 schematically represent metal precipitates, which are contained within the semiconductive material. It is observed that the metal precipitate 23*a* is within the space charge region.

It is believed that the metal precipitate 23*a* in the space charge region gives rise to localized electric fields when reverse voltage is applied to the junction. As a consequence of these localized fields, there is a Zener tunnelling across the junction.

Tests were conducted to determine that this was not a surface effect. For this purpose, a constant reverse current was fed into a wafer through a small wire contact. A second probe at a fixed location was employed as a voltage reference. The voltage between it and a third movable probe was measured for an array of points spaced typically at 0.05 mm. on the surface. Low impedance contact was obtained by passing a current pulse through the probe to effectively weld the same to the wafer at each probe point. FIGURE 4 shows an equipotential plot for a typical diode in accordance with the invention. This shows a localized current path 25 across the junction exists.

Several diodes of the type shown in FIGURE 1 were constructed, in a manner to be presently described. The reverse current characteristics were obtained at 0° C. and −70° C. A typical result is presented in the curve of FIGURE 3. It is observed that at both 0° C. and −70° C., the variation of current with voltage is a power of the voltage.

A study of the curves in FIGURE 3 reveals that the voltage current characteristics are not due to localized avalanche breakdown. The curves show that the same relationship between voltage and current prevails well below the range of avalanche.

As a result of the foregoing, it is believed that the voltage current characteristics shown in FIGURE 3 are due to localized precipitates in the space charge region.

Referring to FIGURE 2, a method of forming semiconductive devices with metal precipitates in the space charge region is schematically illustrated. The steps in forming such devices consist of selecting a slice of semiconductive material of desired resistivity. For example, the slice of material may be a p-type slice of silicon having desired impurity concentration. Phosphorus can then be diffused into the slice to the desired depth to form a junction. Diffusion techniques are well known in the art and will not be further described herein. If a thin layer is desired, the teaching in copending application Serial No. 842,464, filed September 25, 1959, now U.S. Patent 3,041,214, may be followed; namely, forming a layer by multiple diffusions carried out at temperatures lower than are conventionally employed.

After the p-n junction is formed, the wafer is cleaned. Subsequently, suitable metal atoms are deposited upon one of the surfaces. For example, the metal atoms can be contained within aqueous solutions and can be applied to the surface. The solution is then dried leaving a deposit of metal atoms. The metal atoms may be in the form of metal salts.

The coated wafer is then subjected to a diffusion operation at a temperature which is sufficient to cause diffusion of the atoms inwardly into the crystal. After a predetermined time, the slice is removed and allowed to cool. The metal precipitates within the wafer. Subsequently, wax dots of suitable diameter may be applied and the wafer sprayed with an etchant to form a plurality of diode chips.

It is believed that metals which have high diffusion constants, low and strongly temperature dependent solid solubility are preferable for diffusion into the wafer and precipitation therein. By way of example, p-type silicon slices of 0.04 ohm cm. resistivity were cut. Phosphorus was diffused into the slices to a depth of approximately 6 microns, by predepositing with a $P_2O_5$ source at 310° C., with the wafer at 1050° C. for 30 min., and subsequently diffusing at 1300° C. for 15 min.

After diffusion, the slices were treated for five minutes in hydrofluoric acid to remove surface oxides and contaminants. The slices were then treated by applying $Fe(NO_3)_3$; $Cu(NO_3)_2$; $Mn(NO_3)_2$; $ZnCl_2$; and $AuCl_3$, in an aqueous solution to each one of a pair of the slices which were used for the experiment with each metal. After drying the solution, both the treated and untreated slices were heated for ten minutes in $N_2$; 50 minutes in $H_2$; and 10 minutes in $N_2$ at a temperature of 1000° C. The temperature is selected such that the diffusion of metal atoms is relatively rapid and yet such that it does not cause much additional diffusion of impurities at the junction to change junction characteristics.

The nitrogen is not necessary; however, in order to prevent any explosions or the like, it is preferable to purge the furnace with $N_2$ prior to applying the hydrogen and then to again purge the furnace with $N_2$. The heat treatment causes the metal atoms to diffuse into the crystal. The rate of diffusion can be determined from the temperature and the diffusion constant of the particular metal atoms. Thus, it is possible to assure that the metal atoms diffuse far enough to enter the space charge layer of the p-n junction. After the metal diffusion was completed, the slices were removed and cooled to room temperature within 6 minutes. Wax dots of 1 mm. diameter were placed on each of the pairs of wafers. The wafers were etched by spraying with a suitable etchant to produce a large number of diode chips.

The chips were then tested and those having excess currents greater than 10 microamps at a voltage of 12 volts were classified as "soft." Typical soft currents were between 500 and 1500 microamps. The results of 14 runs, each containing a treated and untreated group, and each containing at least 50 diodes, are given below in tabular form.

down or leakage along the surfaces. Devices having "soft" characteristics can be formed by diffusing into the wafer containing the junction metal atoms which have high diffusion constants, low and strongly dependent solid solubility.

I claim:

1. A semiconductor wafer having at least two regions of opposite conductivity type forming a p-n junction having a space charge region, and a metal precipitate selected from the group consisting of copper, iron, manganese and gold disposed in said space charge region.

2. A semiconductor wafer having at least two regions of opposite conductivity type forming a p-n junction having a space charge region, and a copper precipitate disposed in the interior of the wafer at least in the space charge region.

3. A semiconductor wafer having at least two regions of opposite conductivity type forming a p-n junction having a space charge region, and an iron precipitate disposed in the interior of the wafer at least in the space charge region.

4. A semiconductor wafer having at least two regions of opposite conductivity type forming a p-n junction having a space charge region, and a manganese precipitate disposed in the interior of the wafer at least in the space charge region.

5. A semiconductor wafer having at least two regions of opposite conductivity type forming a p-n junction having a space charge region, and a gold precipitate disposed in the interior of the wafer at least in the space charge region.

6. A semiconductor wafer having at least two regions of opposite conductivity type forming a p-n junction, means for applying a reverse bias voltage to said junction to widen the space charge region, and a metal precipitate selected from the group consisting of copper, gold, iron and manganese disposed in said space charge region to thereby provide excessive localized reverse current at the precipitate.

7. A semiconductor wafer as claimed in claim 1 in which said wafer comprises a p-type slice of silicon having phosphorous diffused therein to form said p-n junction.

TABLE I

*Percent Diodes With Excess Currents Greater Than 10 Microamperes*

| Run | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| Metal Atom | Cu | Cu | Cu | Cu | Fe | Fe | Fe | Mn | Mn | Mn | Au | Au | Zn | Zn |
| Treated | 57 | 52 | 36 | 87 | 48 | 43 | 33 | 80 | 50 | 71 | 90 | 85.2 | 1.0 | 2.0 |
| Untreated | 17 | 11 | 9 | 21 | 7 | 20 | 4 | 0 | 18 | 8 | 50.5 | 46.0 | 15.0 | 4.0 |

It is observed that the percentage of soft junctions in treated slices is considerably larger than the percentage of soft junctions in untreated slices. However, it is to be observed that the diffusion of zinc atoms does not produce as pronounced a result.

By appropriately selecting the metals, the powers can be made to lie within a predetermined range. For example, for iron, the power was found to lie in the range of 4 to 5, while for copper, it was found to lie in the range of 5 to 7. It is believed that the faster the cooling cycle, the smaller the precipitates, and that this will tend to control the power.

Although a particular process is described for applying the metal atoms to the surface, it is apparent that the metal atoms can be applied in other ways, for example, the metal atoms may be applied to the surface by plating or evaporation.

Thus, it is seen that there is provided a diode in which the current is proportional to a power of the voltage and in which the reverse current flow is primarily due to tunnelling through the junction rather than to localized break- 8. The method of producing a semiconductor wafer having soft characteristics, said wafer having at least two regions of opposite conductivity forming a p-n junction having a space charge region, which method comprises providing a surface of said wafer with a coating of a metal selected from the group consisting of copper, iron, manganese and gold; heating said coated wafer at a temperature and for a time such that a portion of said metal diffuses to said space charge region without substantial additional diffusion of impurities at said junction; and cooling said wafer to room temperature within six minutes to precipitate said metal in said space charge region.

9. The method of producing a semiconductor wafer having soft characteristics, said wafer having at least two regions of opposite conductivity forming a p-n junction having a space charge region, which method comprises coating a surface of said wafer with an aqueous solution of a salt of a metal selected from the group consisting of copper, iron, manganese and gold; drying said coated surface; heating the dried wafer in a hydrogen atmosphere to reduce said metal salt and cause a portion of the metal so produced to diffuse into said space charge region, the temperature and time of heating being such as to cause said diffusion without substantial additional diffusion of impurities at said junction; and cooling said wafer to room temperature within six minutes to precipitate said metal in said space charge region.

10. The method of claim 9 in which said wafer comprises a p-type slice of silicon having phosphorous diffused therein to form said p-n junction.

11. The method of claim 10 in which said dried wafer is heated for about one hour at a temperature of about 1000° C.

12. The method of claim 11 in which said metal is copper.

13. The method of claim 11 in which said metal is iron.

14. The method of claim 11 in which said metal is manganese.

15. The method of claim 11 in which said metal is gold.

References Cited in the file of this patent

UNITED STATES PATENTS

| | | |
|---|---|---|
| 2,701,326 | Pfann et al. | Feb. 1, 1955 |
| 2,964,689 | Buschert et al. | Dec. 13, 1960 |

FOREIGN PATENTS

| | | |
|---|---|---|
| 632,980 | Great Britain | Dec. 5, 1949 |

OTHER REFERENCES

Physical Review, volume 104, No. 4, November 15, 1956, pages 937–941.

Hannay: Semiconductors, Reynolds Publishing Company, New York, 1959, pages relied on, 256–265.